April 28, 1959  C. PAOLINO, JR  2,884,294
INTERLOCK DEVICE
Filed Nov. 25, 1957

INVENTOR.
Charles Paolino Jr.
BY
W. L. Stout
HIS ATTORNEY

United States Patent Office 2,884,294
Patented Apr. 28, 1959

2,884,294
INTERLOCK DEVICE

Charles Paolino, Jr., Penn Township, Allegheny County, Pa., assignor to Westinghouse Air Brake Company, Wilmerding, Pa., a corporation of Pennsylvania Application November 25, 1957, Serial No. 698,559

12 Claims. (Cl. 312—222)

My invention relates to an interlock device for apparatus having adjacent elements movable between first and second positions where it is desirable to lock an element in its first position when adjacent elements are moved from their first positions.

In particular, my invention relates to an interlock device that may be used on a generally semicircular control machine of the general appearance shown and claimed in the copending design application for Letters Patent of the United States of John W. Logan, Jr. and Robert A Woods, Serial No. 45,251, filed March 14, 1957, for Control Machine, and assigned to the assignee of the present application, now Patent No. D. 183,173, issued July 8, 1958.

Control machines of the class referred to have a plurality of adjacent panels mounted thereon for movement between closed positions in contact with the machine and open positions displaced from the closed positions. Electrical apparatus comprising a plurality of circuits may be mounted on the undersides of the panels where it will be enclosed within the machine when the panels are in their closed positions and accessible for inspection and servicing when the panels are in their open positions. Control devices mounted on the top sides of the panels are connected to the apparatus and are adapted for operation whereby the apparatus may be used to control the operation of remote equipment, for example, automatic car retarders of the class used in railroad classification yards.

If adjacent panels on the control machine are simultaneously moved from their closed positions, interference and damage to the panels may result. Therefore, it is an object of my invention to provide a panel interlock device for apparatus having adjacent panels movable between open and closed positions which may prevent the adjacent panels from being simultaneously moved from their closed positions.

Further, it is an object of my invention to prevent interference and damage to adjacent panels of a control machine by locking one panel in its closed position when adjacent panels are moved from their closed positions.

It is a further object of my invention to provide an interlock for adjacent elements movable between first and second positions.

Also, it is an object of my invention to provide a new and improved panel interlock device which is inexpensive to manufacture and simple to assemble.

In practicing my invention in accordance with one embodiment thereof, I provide a generally semicircular control machine having adjacent panels for movement between closed positions in contact with the machine and open positions displaced from the closed positions. The control machine comprises members which support and engage adjacent panels in their closed positions. A panel interlock device is supported by each member and cooperates with the panels in their closed positions in such a manner that when one of the panels is moved from its closed position, adjacent panels are locked against movement.

It is to be understood that my invention is applicable, in its broader aspects, to control machines, cabinets, and other apparatus having adjacent elements movable between first and second positions.

I shall describe one embodiment of my invention, and shall then point out the novel features thereof in claims.

In describing my invention, reference will be made to the accompanying drawings in which corresponding parts are identified by corresponding reference characters, and in which.

Figure 1:
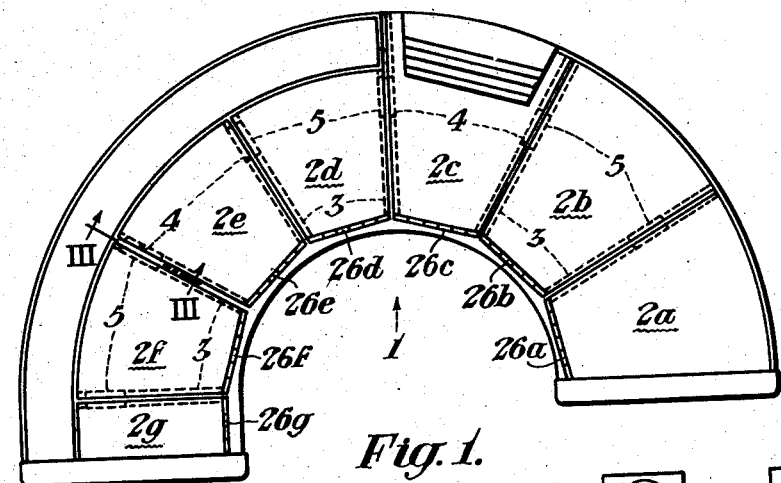
Fig. 1 is a plan view of a control machine embodying my invention.

Referring to Fig. 1, I have there shown a generally semicircular control machine 1 of the class used for controlling the operation of remote equipment located in a railroad classification yard. As shown, the upper surface of machine 1 is provided with a plurality of substantially trapezoidal panels 2a-2f, and a generally rectangular end panel 2g. Panels 2a-2g are adapted to cover openings provided in the upper surface of machine 1 and to have electrical apparatus, not shown, secured to their undersides. In practice, the apparatus would be connected to external circuits, and control switches would be mounted on the top sides of panels 2a-2g and adapted for manual control of the apparatus. Since the details of these features are immaterial to, and do not form a part of my present invention, they are not shown.

Panels 2a-2g are hingedly mounted about non-parallel axes as shown at 26a-26g for movement between closed positions covering the openings in machine 1 and enclosing the electrical apparatus secured thereto, and open positions in which the apparatus is accessible for inspection and servicing. Support members 3 extend from the front to the rear of machine 1 and have upper edges which receive adjacent first edges of panels 2a-2g when the panels are in their closed positions. The upper edges of members 3 are recessed at 4 to receive panel interlock devices 5 which may be used to prevent adjacent panels from simultaneously being moved from their closed positions. Devices 5 are secured to members 3 by any convenient means, for example, by screws 6 (Fig. 2).

Figure 2:
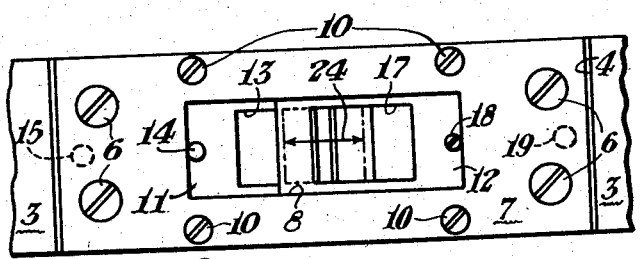
Fig. 2 is a plan view of the interlock device with latches removed taken along the line II—II of Fig. 3.
Figure 3:
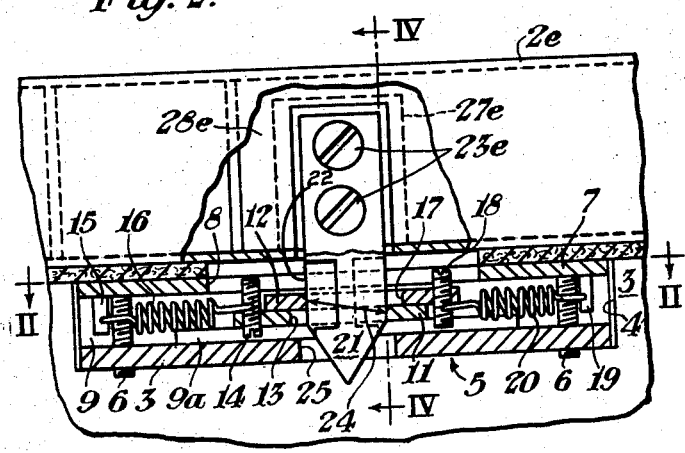
Fig. 3 is an elevational view partially in section taken generally along the line III—III of Fig. 1.
Figure 4:
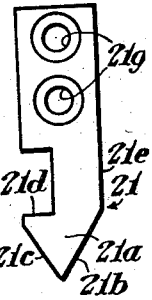
Fig. 4 is an end view partially in section taken along the line IV—IV of Fig. 3.

Each device 5, as shown in Figs. 3 and 4, comprises a cover plate 7 secured to a pair of parallel members 9, by any convenient means, such for example as screws 10. Each cover plate 7 is provided with an aperture 8 for a purpose which will be made clear hereinafter. Parallel members 9 are provided with confronting portions 9a to form guide rails which receive a pair of lock plates 11 and 12 for movement in adjacent parallel planes between first and second positions, as will later be described. Lock plate 11 is urged toward a first position by a spring 16 which is connected at one end to a pin 14 secured to lock plate 11 and connected at the other end to a pin 15 secured to cover plate 7. Similarly, lock plate 12 is urged toward a first position by a spring 20 which is connected at one end to a pin 18 secured to lock plate 12 and connected at the other end to a pin 19 secured to cover plate 7. Lock plates 11 and 12 are held in second positions, as shown in Fig. 3, by cam and latch elements, to be described. Lock plates 11 and 12 are apertured at 13 and 17, respectively, and with aperture 8 in cover plate 7 form a vertical opening 24 (Figs. 2 and 3), when lock plates 11 and 12 are in their second positions, to receive combination cam and latch elements 21 and 22 secured to first edges of panels 2f and 2e, respectively, which will later be described. Member 3 has an opening 25 in its lower edge (Figs. 3 and 4) which receives heads 21a and 22a of elements 21 and 22, respectively, when panels 2f and 2e are in their closed positions.

Figures 5, 6:
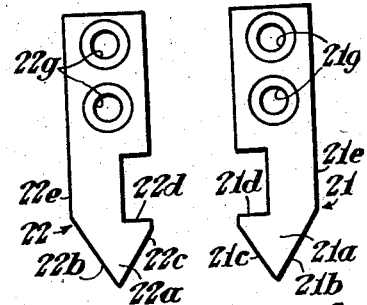
Figs. 5 and 6 are elevational views of the latches of Fig. 3.

Combination cam and latch elements 21 and 22 (Figs. 5 and 6) are secured to the said first edges at panels 2f and 2e, respectively, as shown in Fig. 4 by any suitable means, for example, by screws 23f and 23e passing through openings 21g and 22g in the upper surfaces of elements 21 and 22, respectively, where they are secured to filler plates 27f and 27e and back plates 28f and 28e secured by any suitable means to panels 2f and 2e, respectively. Referring to Fig. 6, element 21 has a cam portion comprising a tapered edge 21b of head 21a and a straight edge 21e extending upwardly from head 21a. With panel 2e in its closed position, as panel 2f is moved toward its closed position, edge 21b initially engages a surface of lock plate 11, when plate 11 is in its first position, for urging the plate toward its second position, and when panel 2f is in its closed position, edge 21e engages the surface of lock plate 11 to retain plate 11 in its second position.

During assembly of machine 1 and device 5, when lock plates 11 and 12 are positioned as shown in Fig. 2, and it is desired to initially place panel 2f in its closed position, tapered edge 21c of head 21a engages a surface of lock plate 12 and urges plate 12 toward its second position while edge 21b simultaneously engages a surface of lock plate 11 and urges plate 11 toward its second position to permit element 21 to be received within opening 24.

Element 21 is notched to form a latch portion 21d which is inactive when lock plate 12 is in its second position but which engages a surface of lock plate 12 when plate 12 is urged toward its first position by spring 20 when panel 2e is moved from its closed position, thereby locking panel 2f in its closed position.

Similarly, as shown in Fig. 5, element 22 has a cam portion comprising a tapered edge 22b of head 22a and a straight edge 22e extending upwardly from head 22a, a tapered edge 22c to permit element 22 and its associated panel 2e to be received within opening 24 during assembly of machine 1 and device 2, as shown in Fig. 2 and as previously described, and is notched to form a latch portion 22d which is inactive when lock plate 11 is in its second position but which engages a surface of lock plate 11 when plate 11 is urged toward its first position by spring 16 when panel 2f is moved from its closed position, thereby locking panel 2e in its closed position.

In operation, with panels 2f and 2e initially in their closed positions, elements 21 and 22 are located within opening 24, and cam portion (edge 21e) of element 21 engages a surface of lock plate 11 and holds lock plate 11 in its second position. Similarly, cam portion (edge 22e) of element 22 engages a surface of lock plate 12 and holds lock plate 12 in its second position. When, for example, panel 2f is moved toward its open position, and element 21 is removed from opening 24, lock plate 11 is urged toward its first position where it engages latch portion 22d of element 22 in a locking relationship whereby panel 2e is locked in its closed position. Similarly, if panel 2e is moved toward its open position when panel 2f is in its closed position, and element 22 is removed from opening 24, lock plate 12 is urged toward its first position where it engages latch portion 21d of element 21 in a locking relationship whereby panel 2f is locked in its closed position. As shown in Fig. 1, devices 5 are mounted on members 3 at both sides of the panels so that as one panel, for example panel 2f, is moved from its closed position, adjacent panels 2e and 2g will both be locked in their closed positions.

When a panel, for example panel 2f, is moved from its open position to its closed position with adjacent panels locked in their closed positions, the cam portion of element 21 (edges 21b and 21e) engages a surface of lock plate 11 located in its first position and urges plate 11 toward its second position so that element 21 may be received within opening 24 when panel 2f is in its closed position. Lock plate 12 remains stationary, as it is held to its second position by the cam portion (edge 22e) of element 22. Similarly, panel 2e may be moved from its open to its closed position with adjacent panels in their closed positions.

Although I have herein shown and described only one form of panel interlock device embodying my invention, it is to be understood that various changes and modifications may be made therein within the scope of the appended claims without departing from the spirit and scope of my invention.

Having thus described my invention, what I claim is:

1. In a control machine having a plurality of adjacent substantially trapezoidal panels hingedly mounted thereon about the shortest of their parallel sides, said panels being adapted to have electrical apparatus mounted on the undersides thereof and switching means mounted on the top sides thereof adapted to control the operation of said apparatus, said panels having movement between closed positions in which said apparatus is enclosed within said machine and open positions in which said apparatus is accessible for inspection and servicing, the hinge axes of said panels being non-parallel, whereby two adjacent panels cannot simultaneously occupy their open positions without interference, and interlocking means connected to said panels and said machine and operated by movement of any of said panels from its closed position for locking adjacent panels in their closed positions.

2. Apparatus of the class described, comprising, in combination, a cabinet, first and second adjacent panels mounted on said cabinet for movement between first and second positions, a pair of parallel guide rails mounted on said cabinet, first and second lock plates slidably mounted within said guide rails for movement in parallel planes between first and second positions, an aperture in each of said plates, portions of said apertures being aligned to form an opening when the said plates are in their second positions, spring means urging said plates toward their first positions, a first element connected to said first panel and extending through said opening, said element having a cam portion holding said first lock plate in its second position, a latch portion on said element engaging said second lock plate in its first position to prevent movement of the associated panel, a second element connected to said second panel and extending through said opening, said second element having a cam portion holding said second lock plate in its second position, and a latch portion on said second element engaging said first lock plate in its first position to prevent movement of the associated panel, whereby when either is moved to its second position movement of the other panel is prevented.

3. Apparatus of the class described, comprising, in combination, a control machine, first and second panels mounted on said machine for movement between first and second positions, said panels having edges which are adjacent in the first positions of said panels, a pair of parallel guide rails mounted on said machine, first and second lock plates slidably mounted within said guide rails for movement in parallel planes between first and second positions, an aperture in each of said plates, portions of said apertures being aligned when said plates are in their second positions to form an opening, spring means connected between said guide rails and said first and second lock plates urging said plates toward their first positions, latch means secured to each of said edges of said panels and extending through said opening when said panels are in their first positions, each latch means engaging an associated one of said plates in its first position to lock its associated panel in its first position, and cam means secured to each of said edges of said panels and extending through said opening when said panels are in their first positions, each cam means engaging an associated one of said plates to hold it in its second position.

4. Apparatus of the class described, comprising, in combination, an arcuate cabinet having first and second access panels hingedly mounted thereon, said panels having movement between closed positions covering openings of said cabinet for housing electrical apparatus therein, and open positions permitting access to said electrical apparatus for inspection and servicing, said cabinet having a support member extending between said openings to support adjacent first edges of said panels, lock means slidably mounted on said member for movement in parallel planes between first and second positions, spring means connected between said member and said lock means to urge said lock means to said first positions, cam means connected to said adjacent first edges of said panels engaging said lock means in their second positions when said lock means and their associated panels are in their closed positions, and latch means secured to said adjacent first edges of said panels engaging said lock means in said first positions, whereby when either panel is moved from its closed position the latch means secured to said first edge of the other panel engages one of said lock means in its first position to lock the other panel in its closed position.

5. Apparatus of the class described, comprising, in combination, a control machine, first and second panels mounted on said machine for movement between first and second positions, said panels having edges which are adjacent in the first positions thereof, a first lock plate slidably mounted on said machine for movement between first and second positions and biased to its first position, a second lock plate slidably mounted on said machine for movement between first and second positions and biased to its first position, a first member mounted on said edge of said first panel, cam means on said first member engaging said first lock plate to hold said first lock plate in its second position when said first panel is in its first position, locking means on said first member engaging said second lock plate in its first position to lock said first panel in its first position when said second panel is moved from its first position, a second member mounted on said edge of said second panel, cam means on said second member engaging said second lock plate to hold said second lock plate in its second position when said second panel is in its first position, and locking means on said second member engaging said first lock plate in its first position to lock said second panel in its first position when said first panel is moved from its first position, whereby upon movement of either panel from its first position the other panel is locked in its first position by one of said lock plates moving toward its first position and engaging the locking means associated with said other panel.

6. A panel interlock for first and second panels hingedly mounted on a cabinet for movement between closed positions engaging said cabinet and open positions displaced from said closed positions, comprising, in combination, a first lock plate slidably mounted on said cabinet for movement between first and second positions, first means connected between said cabinet and said lock plate for urging said plate toward its first position, a second lock plate slidably mounted on said cabinet for movement between first and second positions, second means connected between said cabinet and said second lock plate for urging said second lock plate toward its first position, first cam means mounted on said first panel engaging said first lock plate in the closed position of said first panel and holding said first lock plate in its second position, first latch means mounted on said first panel engaging said second lock plate in its first position when said first panel is in its closed position and said second panel is moved from its closed position, second cam means mounted on said second panel engaging said second lock plate in the closed position of said second panel and holding said second lock plate in its second position, and second latch means mounted on said second panel engaging said first lock plate in its first position when said second panel is in its closed position and said first panel is moved from its closed position, whereby movement of either panel from its closed position releases the lock plate held by the cam means mounted on the moved panel, said released lock plate engaging the latch means mounted on the remaining panel and locking the panel to the cabinet.

7. A panel interlock for a control machine having first and second access panels hingedly mounted thereon, said panels being adapted to have electrical apparatus secured to their undersides and being movable between closed positions covering openings in the upper surface of said machine for housing said electrical apparatus within said machine, and open positions permitting access to said apparatus for inspection and servicing, said machine having a support member extending between said openings to support adjacent edges of said panels, comprising, in combination, a first lock plate slidably mounted on said member for movement between first and second positions, first means connected between said member and said plate for urging said plate toward its first position, a second lock plate slidably mounted on said member for movement between first and second positions, second means connected between said member and said second lock plate for urging said second lock plate toward its first position, a first member mounted on the edge of said first panel, cam means on said first member engaging said first lock plate and holding said first lock plate in its second position when said first panel is in its closed position, locking means on said first member engaging said second lock plate in its first position and locking said first panel in its closed position when said second panel is moved from its closed position, a second member mounted on the edge of said second panel, cam means on said second member engaging said second lock plate and holding said second lock plate in its second position when said second panel is in its closed position, and locking means on said second member engaging said first lock plate in its first position and locking said second panel in its closed position when said first panel is moved from its closed position, whereby upon movement of either panel from its closed position the other panel is locked in its closed position by one of said lock plates moving toward its first position and engaging the locking means associated with said other panel.

8. A panel interlock for first and second panels; said panels being mounted, on a cabinet comprising a support member, for movement between closed and open positions; comprising, in combination, a first lock plate slidably mounted on said member for movement between first and second positions and biased to its first position, a second lock plate slidably mounted on said member for movement between first and second positions and biased to its first position, a first member mounted on said first panel, cam means on said first member engaging said first lock plate and holding said first lock plate in its second position when said first panel is in its closed position, locking means on said first member engaging said second lock plate in its first position and locking said first panel in its first position when said second panel is moved toward its open position, a second member mounted on said second panel, cam means on said second member engaging said second lock plate and holding said second lock plate in its second position when said second panel is in its closed position, and locking means on said second member engaging said first lock plate in its first position and locking said second panel in its closed position when said first panel is moved toward its open position, whereby upon movement of either panel toward its open position the other panel is locked in its closed position by one of said lock plates moving toward its first position, and engaging the locking means associated with said other panel.

9. In combination with two closure members pivotally mounted for movement between closed and interfering open positions, two latch plates each biased to a latching position, and two cam and latch elements one secured to each of said members, said cam and latch elements cooperating with said latch plates in such a manner that movement of either member toward its open position will permit one of said latch plates to move into latching engagement with the latch element secured to the other member to retain it in its closed position.

10. Apparatus of the class described, comprising, in combination, an arcuate control machine having first and second access panels hingedly mounted thereon, said panels being adapted to have electrical apparatus secured to their undersides and being movable between closed positions covering openings in the upper surface of said machine for housing electrical apparatus within said machine and open positions permitting access to said apparatus for inspection and servicing, said machine having a support member extending between said openings to support adjacent first edges of said panels, a pair of parallel guide rails, first and second lock plates slidably mounted within said guide rails for movement in parallel planes between first and second positions, an aperture in each of said plates, said apertures forming an opening when the said plates are in their second positions, means connected between said guide rails and said first and second lock plates urging said plates toward their first positions, a first element secured to said first edge of said first panel and extending through said opening, said element having a cam portion holding said first lock plate in its second position, a latch portion on said element engaging said second lock plate in its first position to prevent the removal of said first element, a second element secured to said first edge of said second panel and extending through said opening, said second element having a cam portion holding said second lock plate in its second position, and a latch portion on said second element engaging said first lock plate in its first position to prevent the removal of said second element, whereby when either panel is moved from its closed position the movement of the other panel is prevented.

11. An interlock, comprising, in combination, a pair of parallel guide rails, first and second lock plates slidably mounted within said guide rails for movement between first and second positions, an aperture in each of said plates, said apertures having an aligned opening when the said plates are in their second position, spring means connected between said guide rails and said first and second lock plates urging said plates toward their first positions, a first element extending through said opening, said element having a cam portion holding said first lock plate in its second position, a latch portion on said element engaging said second lock plate in its first position to prevent the removal of said first element, a second element extending through said opening, said second element having a cam portion holding said second lock plate in its second position, and a latch portion on said second element engaging said first lock plate in its first position to prevent the removal of said second element, whereby when either element is removed from the said opening the removal of the other element is prevented.

12. An interlock device of the class described, comprising, in combination, a housing, lock means slidably mounted on said housing for movement between first and second positions, means connected between said housing and said lock means for urging said lock means toward their first positions, first and second members having movement between first and second positions, said members having a cam surface engaging said lock means in said second positions, and a latch surface engaging said lock means in said first positions, whereby when either member is moved from its first toward its second position the latch surface of the other member engages one of said lock means in its first position to lock the other member in its first position.

References Cited in the file of this patent
UNITED STATES PATENTS

| | | |
|---|---|---|
| 1,368,863 | Turner | Feb. 15, 1921 |
| 2,674,510 | Gray | Apr. 6, 1954 |